(12) United States Patent
Ohashi et al.

(10) Patent No.: US 10,424,813 B2
(45) Date of Patent: Sep. 24, 2019

(54) NON-AQUEOUS ELECTROLYTE SOLUTION AND NON-AQUEOUS ELECTROLYTE SECONDARY BATTERY USING SAME

(71) Applicant: MITSUBISHI CHEMICAL CORPORATION, Tokyo (JP)

(72) Inventors: Youichi Ohashi, Tokyo (JP); Takashi Fujii, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/703,411

(22) Filed: Sep. 13, 2017

(65) Prior Publication Data

US 2018/0034105 A1    Feb. 1, 2018

Related U.S. Application Data

(63) Continuation of application No. PCT/JP2016/058103, filed on Mar. 15, 2016.

(30) Foreign Application Priority Data

Mar. 16, 2015    (JP) ................ 2015-052296

(51) Int. Cl.
H01M 10/0567        (2010.01)
H01M 10/0569        (2010.01)
H01M 10/0525        (2010.01)

(52) U.S. Cl.
CPC ... H01M 10/0567 (2013.01); H01M 10/0525 (2013.01); H01M 10/0569 (2013.01); H01M 2300/0025 (2013.01); H01M 2300/0034 (2013.01); Y02T 10/7011 (2013.01)

(58) Field of Classification Search
CPC ......... H01M 10/0525; H01M 10/0567; H01M 10/0569; H01M 2300/0025; H01M 2300/0034; Y02T 10/7011
See application file for complete search history.

(56) References Cited

U.S. PATENT DOCUMENTS

| | | |
|---|---|---|
| 2010/0216035 A1 | 8/2010 | Iwanaga et al. |
| 2011/0229772 A1 | 9/2011 | Fujinami et al. |
| 2013/0093392 A1 | 4/2013 | Odani et al. |
| 2013/0230768 A1 | 9/2013 | Sakamoto et al. |
| 2015/0236382 A1 | 8/2015 | Wietelmann et al. |
| 2016/0226103 A1* | 8/2016 | Teran ............ C07C 69/96 |

FOREIGN PATENT DOCUMENTS

| | | |
|---|---|---|
| EP | 3203569 A1 | 8/2017 |
| JP | 07-176322 A | 7/1995 |
| JP | 07-201359 A | 8/1995 |
| JP | 09-213368 A | 8/1997 |
| JP | 2004-031244 A | 1/2004 |
| JP | 2010-198916 A | 9/2010 |
| JP | 2012-079639 A | 4/2012 |
| JP | 2013-089468 A | 5/2013 |
| JP | 2013-225388 A | 10/2013 |
| JP | 2014-132576 A | 7/2014 |
| JP | 2015-111495 A | 6/2015 |
| JP | 2015-179670 A | 10/2015 |
| JP | 2015-195135 A | 11/2015 |
| WO | WO-2012/002396 A1 | 1/2012 |
| WO | WO-2013/160342 A1 | 10/2013 |

OTHER PUBLICATIONS

Extended European Search Report dated Dec. 11, 2017 for the corresponding European Patent Application No. 16764958.1.
International Search Report dated Jun. 14, 2016 for the corresponding PCT Application No. PCT/JP2016/058103.
International Preliminary Report on Patentability dated Sep. 28, 2017 for the corresponding PCT Application No. PCT/JP2016/058103.
Office Action dated Apr. 3, 2019 for the corresponding European Patent Application No. 16764958.1.

* cited by examiner

Primary Examiner — Brittany L Raymond
(74) Attorney, Agent, or Firm — Leason Ellis LLP

(57) ABSTRACT

Provided is a non-aqueous electrolyte solution that enables the fabrication of a non-aqueous secondary battery with which gas generation during battery use in high-temperature environments or with continuous charging is suppressed. Also provided is a non-aqueous electrolyte secondary battery that uses this non-aqueous electrolyte solution. The non-aqueous electrolyte solution is used in a non-aqueous electrolyte secondary battery that has a positive electrode having a positive electrode active material capable of absorbing and releasing a metal ion, and a negative electrode having a negative electrode active material capable of absorbing and releasing a metal ion, the non-aqueous electrolyte solution containing a compound represented by formula (1) and a nitrile compound in prescribed contents.

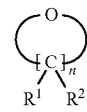

(1)

9 Claims, No Drawings

NON-AQUEOUS ELECTROLYTE SOLUTION AND NON-AQUEOUS ELECTROLYTE SECONDARY BATTERY USING SAME

CROSS-REFERENCE TO RELATED APPLICATION

This is a continuation of International Application PCT/JP2016/058103, filed on Mar. 15, 2016, and designated the U.S., and claims priority from Japanese Patent Application 2015-052296 which was filed on Mar. 16, 2015, the entire contents of which are incorporated herein by reference.

TECHNICAL FIELD

The present invention relates to a non-aqueous electrolyte solution and to a non-aqueous electrolyte secondary battery that uses this non-aqueous electrolyte solution.

BACKGROUND ART

The rapid advances in electronic devices and electric automobiles are being accompanied by greater demand for increased capacity of secondary batteries, and non-aqueous electrolyte batteries, such as lithium ion secondary batteries with high energy densities, are widely used and are under active investigation.

The electrolyte solution used in non-aqueous electrolyte batteries is generally constituted primarily of an electrolyte salt and a non-aqueous solvent. A non-aqueous electrolyte solution provided by the dissolution of an electrolyte, e.g., $LiPF_6$, in a mixed solvent of a high dielectric constant solvent, e.g., a cyclic carbonate, with a low-viscosity solvent, e.g., a chain carbonate, is used as an electrolyte solution in lithium ion secondary batteries.

When a lithium ion secondary battery undergoes repetitive charge/discharge, the battery capacity declines due to the occurrence of, for example, decomposition of the electrolyte at electrode surfaces, deterioration of the materials making up the battery, and so forth. In addition, depending on the case, the stability with respect to, e.g., battery swelling, rupture, and so forth, may also be reduced.

To date, methods have been proposed for improving the battery characteristics of lithium ion secondary batteries through the use of specific non-aqueous electrolyte solutions. For example, PTL 1 reports that the decline in charge/discharge performance associated with the battery swelling and increased internal impedance caused by decomposition of the electrolyte solution during the first charging cycle is suppressed by the incorporation, in the electrolyte solution or solid electrolyte, of tetrahydropyran or a derivative thereof. PTL 2 reports that—through the addition in a proportion of 0.001 to 0.1 mol/L of an organic compound having two or more cyano groups to an electrolyte solution in which a lithium salt is dissolved in a non-aqueous solvent—a Li secondary battery can be formed that has an excellent electromotive force, discharge capacity, and charge/discharge cycle life and that can be stably charged at high voltages in excess of 4.2 V. In addition, PTL 3 reports that—through the use of a non-aqueous electrolyte solution containing at least 25 volume % and not more than 40 volume % (25° C., 1 atm) ethylene carbonate and containing 1,3-dioxane and a dinitrile compound as additives—a non-aqueous electrolyte secondary battery is obtained that is capable of high-voltage charging and that exhibits excellent cycling characteristics and an excellent high-temperature storability.

CITATION LIST

Patent Literature

[PTL 1] Japanese Patent Application Laid-open No. H09-213368

[PTL 2] Japanese Patent Application Laid-open No. H07-176322

[PTL 3] Japanese Patent Application Laid-open No. 2010-198916

SUMMARY OF THE INVENTION

Problem to be Solved by Invention

A problem for the present invention is to provide, with respect to non-aqueous electrolyte secondary batteries, a non-aqueous electrolyte solution that can suppress gas generation during battery use in high-temperature environments and can suppress reductions in the battery voltage, and in addition, can suppress gas generation during cycling and continuous charging, and that thus enables the production of an excellent battery; and to provide a non-aqueous electrolyte secondary battery that uses this non-aqueous electrolyte solution.

Means for Solving the Problem

The inventions described in PTL 1, 2, and 3 certainly do contribute to improving some battery characteristics, but provide no solution whatever with regard to gas generation during continuous charging and in high-temperature environments, which is particularly important for battery stability.

The present inventors carried out a variety of investigations in order to solve the aforementioned problem and as a result discovered that this problem could be solved and thereby achieved the present invention.

That is, the gist of the present invention is the following.

(1)

A non-aqueous electrolyte solution used in a non-aqueous electrolyte secondary battery that has a positive electrode having a positive electrode active material capable of absorbing and releasing a metal ion, and a negative electrode having a negative electrode active material capable of absorbing and releasing a metal ion, the non-aqueous electrolyte solution containing:

a compound represented by formula (1) in a content of at least 0.01 mass % and not more than 10 mass % with reference to the entire non-aqueous electrolyte solution; and a nitrile compound in a content of at least 0.01 mass % and not more than 5 mass % with reference to the entire non-aqueous electrolyte solution.

[C1]

(1)

(in the formula, $R^1$ and $R^2$ are each independently selected from a hydrogen atom, alkyl groups having 1 to 10 carbons, alkenyl groups having 2 to 10 carbons, alkynyl groups having 2 to 10 carbons, and aryl groups having 6 to 10 carbons, and n represents an integer that is at least 5 and not more than 10).

(2)

The non-aqueous electrolyte solution according to (1), wherein the compound represented by formula (1) is a compound in which n is 5 or 6.

(3)

The non-aqueous electrolyte solution according to (1), wherein the compound represented by formula (1) is a compound in which n is 5.

(4)

The non-aqueous electrolyte solution according to any of (1) to (3), wherein the nitrile compound is a compound that has two or more cyano groups.

(5)

The non-aqueous electrolyte solution according to any of (1) to (4), that contains at least one compound selected from fluorinated cyclic carbonates and cyclic sulfate esters.

(6)

A non-aqueous electrolyte secondary battery including: a positive electrode having a positive electrode active material capable of absorbing and releasing a metal ion; a negative electrode having a negative electrode active material capable of absorbing and releasing a metal ion; and a non-aqueous electrolyte solution, wherein the non-aqueous electrolyte solution is the non-aqueous electrolyte solution according to any of (1) to (5).

Effects of the Invention

The present invention can provide an excellent non-aqueous electrolyte secondary battery that can suppress gas generation during continuous charging and in high-temperature environments.

DESCRIPTION OF EMBODIMENTS

Embodiments of the present invention are described in detail in the following. However, the description provided in the following is an example (representative example) of embodiments of the present invention, and the present invention is not limited to or by the content thereof as long as the gist of the description in the claims is not exceeded. In addition, unless specifically indicated otherwise, the individual embodiments may also be combined.

[1. Non-Aqueous Electrolyte Solution]

The non-aqueous electrolyte solution of the present invention contains, in the same manner as common non-aqueous electrolyte solutions, an electrolyte and a non-aqueous solvent that dissolves the electrolyte, and is mainly characterized by containing, in prescribed contents, a nitrile compound and a cyclic ether compound represented by formula (1) that has 1 oxygen atom within the molecule.

[1-1. Compound Represented by Formula (1)]

The compound represented by formula (1) described in the claims is a cyclic ether compound that has 1 oxygen atom in the molecule.

[C2]

(1)

(In the formula, $R^1$ and $R^2$ are each independently selected from a hydrogen atom, alkyl groups having 1 to 10 carbons, alkenyl groups having 2 to 10 carbons, alkynyl groups having 2 to 10 carbons, and aryl groups having 6 to 10 carbons, and n represents an integer that is at least 5 and not more than 10.)

Among the hydrogen atom, alkyl groups having 1 to 10 carbons, alkenyl groups having 2 to 10 carbons, alkynyl groups having 2 to 10 carbons, and aryl groups having 6 to 10 carbons, the hydrogen atom and alkyl groups having 1 to 10 carbons are preferred because they provide suitable reactions at the positive electrode surface and the effects of the present invention are thereby exhibited to a large degree.

Examples of the alkyl group in formula (1) include methyl group, ethyl group, propyl group, isopropyl group, butyl group, isobutyl group, t-butyl group, and t-amyl group. Examples of the alkenyl group include the vinyl group, allyl group, 1-propenyl group, and 1-butenyl group. Examples of the alkynyl group include the ethynyl group and propynyl group. Examples of the aryl group include the phenyl group, 2-tolyl group, 3-tolyl group, 4-tolyl group, benzyl group, and 4-t-butylphenyl group. Among these, methyl group, ethyl group, propyl group, isopropyl group, t-butyl group, and t-amyl group are preferred, while methyl group, ethyl group, and propyl group are particularly preferred. These are preferred because they provide a suitable reactivity and provide a low battery internal resistance. The hydrogen atom, methyl group, ethyl group, and propyl group are preferred for $R^1$ and $R^2$ for the same reasons.

The n in formula (1) is preferably not more than 10, more preferably not more than 8, and particularly preferably not more than 6 and is most preferably 5. Within this range, a suitable reactivity is obtained at the positive electrode surface and the positive electrode is protected and the effects of the present invention are thereby substantially exhibited.

Examples of the cyclic ether compound having 1 oxygen atom in the molecule and represented by formula (1) include the following specific compounds:

tetrahydropyran, 2-methyltetrahydropyran, 2-ethyltetrahydropyran, 3-methyltetrahydropyran, 3-ethyltetrahydropyran, 4-methyltetrahydropyran, 4-ethyltetrahydropyran, 2,2-dimethyltetrahydropyran, 2,3-dimethyltetrahydropyran, 2,4-dimethyltetrahydropyran, 3,3-dimethyltetrahydropyran, 3,4-dimethyltetrahydropyran, 4,4-dimethyltetrahydropyran, 2-vinyltetrahydropyran, 3-vinyltetrahydropyran, 4-vinyltetrahydropyran, 2-ethynyltetrahydropyran, 3-ethynyltetrahydropyran, 4-ethynyltetrahydropyran, 2-phenyltetrahydropyran, 3-phenyltetrahydropyran, 4-phenyltetrahydropyran, hexamethylene oxide, 2-methylhexamethylene oxide, 3-methylhexamethylene oxide, 4-ethylhexamethylene oxide, 2-vinylhexamethylene oxide, 3-ethynylhexamethylene oxide, 4-phenylhexamethylene oxide, heptamethylene oxide, 2-methylheptamethylene oxide, 3-methylheptamethylene oxide, 4-ethylheptamethylene oxide, octamethylene oxide, nonamethylene oxide, and decamethylene oxide. As is clear from these examples, the "$R^1$ and $R^2$ are each independently" with reference to formula (1) means that the plural number of $R^1$ (at least 5 and not more than 10) may each be the same or may each differ; the plural number of $R^2$ (at least 5 and not more than 10) may each be the same or may each differ; and the plural number of the $R^1$ and $R^2$ may each be the same or may each differ.

Among the preceding, tetrahydropyran, 2-methyltetrahydropyran, 2-ethyltetrahydropyran, 3-methyltetrahydropyran, 3-ethyltetrahydropyran, 4-methyltetrahydropyran, 4-ethyltetrahydropyran, 2,2-dimethyltetrahydropyran, and hexamethylene oxide are preferred;

tetrahydropyran, 2-methyltetrahydropyran, 2-ethyltetrahydropyran, 2,2-dimethyltetrahydropyran, and hexamethylene oxide are more preferred;

tetrahydropyran and hexamethylene oxide are particularly preferred; and tetrahydropyran is most preferred.

A large inhibitory effect on gas generation is obtained when the compounds provided as preferred examples are used.

When the aforementioned compound is used, its content in the non-aqueous electrolyte solution is generally at least 0.01 mass %, preferably at least 0.1 mass %, more preferably at least 0.3 mass %, and most preferably at least 0.5 mass %. In addition, its use in a content of not more than 10 mass % is preferred; its use in a content of not more than 7 mass % is more preferred; its use in a content of not more than 4 mass % is particularly preferred; and its use in a content of not more than 3 mass % is most preferred. By using the compound at the indicated content, sufficient inhibitory effect on gas generation can be exhibited and also, undesirable increases in resistance can be suppressed.

[1-2. Nitrile Compound]

There are no particular limitations on the nitrile compound described in the claims, and the following are provided as examples.

Mononitriles, dinitriles, trinitriles, and tetranitriles are preferred. This is because the compound assumes a large toxicity when the number of nitrile groups is too large. Among mononitriles, mononitriles having 2 to 20 carbons are preferred; mononitriles having 3 to 18 carbons are more preferred; and mononitriles having 4 to 11 carbons are particularly preferred. Among dinitriles, dinitriles having 3 to 20 carbons are preferred; dinitriles having 4 to 10 carbons are more preferred; and dinitriles having 5 to 8 carbons are particularly preferred. Among trinitriles, trinitriles having 4 to 20 carbons are preferred; trinitriles having 5 to 18 carbons are more preferred; and trinitriles having 6 to 11 carbons are particularly preferred. Among tetranitriles, tetranitriles having 5 to 20 carbons are preferred; tetranitriles having 6 to 18 carbons are more preferred; and tetranitriles having 7 to 11 carbons are particularly preferred. When these ranges are observed, a large protective effect of the electrode is obtained and viscosity increases can be suppressed.

A sufficient effect can be obtained even when the nitrile compound used in the present invention is a mononitrile; however, a large inhibitory effect on gas generation is obtained in particular when the nitrile compound used in the present invention is a nitrile compound having two or more cyano groups, and this is thus preferred. That is, the aforementioned dinitriles, trinitriles, and tetranitriles are preferred.

Specific examples of the nitrile compounds include, for example, the following:

acetonitrile, propionitrile, butyronitrile, valeronitrile, hexanenitrile, heptanenitrile, octanenitrile, nonanenitrile, decanenitrile, lauronitrile, tridecanenitrile, tetradecanenitrile, hexadecanenitrile, pentadecanenitrile, heptadecanenitrile, octadecanenitrile, nonadecanenitrile, eicosanenitrile, crotononitrile, methacrylonitrile, acrylonitrile, methoxyacrylonitrile, malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile, 3,9-bis(2-cyanoethyl)-2,4,8,10-tetraoxaspiro[5,5]undecane, 1,2,3-propanetricarbonitrile, 1,3,5-pentanetricarbonitrile, 1,3,6-hexanetricarbonitrile, 1,2,3-tris(2-cyanoethoxy)propane, and tris(2-cyanoethyl)amine.

Among the preceding, valeronitrile, octanenitrile, lauronitrile, tridecanenitrile, tetradecanenitrile, hexadecanenitrile, pentadecanenitrile, heptadecanenitrile, octadecanenitrile, nonadecanenitrile, crotononitrile, acrylonitrile, methoxyacrylonitrile, malononitrile, succinonitrile, glutaronitrile, adiponitrile, pimelonitrile, suberonitrile, azelanitrile, sebaconitrile, undecanedinitrile, dodecanedinitrile, 3,9-bis(2-cyanoethyl)-2,4,8,10-tetraoxaspiro[5,5]undecane, and fumaronitrile are preferred; valeronitrile, octanenitrile, lauronitrile, succinonitrile, glutaronitrile, adiponitrile, pimelonitrile, suberonitrile, 3,9-bis(2-cyanoethyl)-2,4,8,10-tetraoxaspiro[5,5]undecane, and 1,3,6-hexanetricarbonitrile are more preferred; and succinonitrile, adiponitrile, pimelonitrile, suberonitrile, and 1,3,6-hexanetricarbonitrile are particularly preferred. This is because these nitrile compounds have a large inhibitory effect on gas generation.

A single one of these may be used alone or two or more may be used in combination.

The content of the nitrile compound is generally at least 0.01 mass % and is preferably at least 0.1 mass %, more preferably at least 0.3 mass %, and most preferably at least 0.5 mass %. In addition, use at a content of not more than 5 mass % is preferred; use at a content of not more than 4 mass % is more preferred; and use at not more than 3 mass % is most preferred. By using the compound in the indicated content, sufficient inhibitory effect on gas generation can be obtained and also, undesirable increases in resistance can be suppressed.

The content ratio between the compound represented by formula (1) and the nitrile compound, expressed as the mass ratio, is preferably 1:99 to 99:1, more preferably 10:90 to 90:10, particularly preferably 20:80 to 80:20, and particularly preferably 30:70 to 70:30. By use the compounds at these ratios, synergistic effects of the compound represented by formula (1) and the nitrile compound can be exhibited and sufficient inhibitory effect on gas generation can be obtained.

The essential features of the present invention are a non-aqueous electrolyte solution that contains, with reference to the entire non-aqueous electrolyte solution, the compound represented by formula (1) at a content of at least 0.01 mass % and not more than 10 mass % and a nitrile compound at a content of at least 0.01 mass % and not more than 5 mass %, and a non-aqueous electrolyte secondary battery that uses this non-aqueous electrolyte solution; however, the reasons for the effects therefrom are not clear. However, according to investigations by the inventors, the effects can be hypothesized as follows. Thus, when the compound represented by formula (1) is used alone, a film is formed on the positive electrode and solvent decomposition is inhibited; however, at high potentials at the positive electrode surface, this film itself also ends up undergoing decomposition and as a result its effects cannot be maintained. On the other hand, when the compound represented by formula (1) and the nitrile compound are used in combination in suitable amounts, a film having the strength to resist decomposition at high potentials at the positive electrode surface is unexpectedly formed. It is thought that the effects of the present invention are obtained due to this action.

[1-3. Fluorinated Cyclic Carbonate]

Examples of the fluorine atom-containing cyclic carbonate (also referred to in the following as the "fluorinated cyclic carbonate") include fluorinated compounds of cyclic carbonates that have an alkylene group having at least 2 and not more than 6 carbons, and derivatives thereof, for example, fluorinated compounds of ethylene carbonate (also referred to in the following as "fluorinated ethylene carbonate"), and derivatives thereof. Examples of the derivatives of fluorinated ethylene carbonate include fluorinated compounds of alkyl group-substituted ethylene carbonate (the alkyl group having, for example, at least 1 and not more than 4 carbons). Among the preceding, fluorinated ethylene carbonates having at least 1 and not more than 8 fluorines, and derivatives thereof, are preferred.

Examples of fluorinated ethylene carbonates having 1 to 8 fluorines and derivatives thereof include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

Among the preceding, monofluoroethylene carbonate, 4,4-difluoroethylene carbonate, and 4,5-difluoroethylene carbonate are preferred because they impart a high ionic conductivity to the electrolyte solution and because they readily form a stable interface protective film. A single one of these may be used alone or two or more may be used in combination.

The content of the fluorinated cyclic carbonate, with reference to the entire non-aqueous electrolyte solution, is preferably at least 0.01 mass %, more preferably at least 0.1 mass %, and most preferably at least 0.5 mass %. Moreover, use at a content of not more than 15 mass % is preferred; use at a content of not more than 10 mass % is more preferred; and use at not more than 7 mass % is more preferred. By use fluorinated cyclic carbonate at the indicated content, sufficient improvements in the high-temperature storage characteristics can be obtained and the cycle characteristics and in addition, undesirable gas generation can be suppressed. In addition, when monofluoroethylene carbonate is used, rather than the limits given above, its content is preferably at least 0.1 mass %, more preferably at least 0.3 mass %, particularly preferably at least 0.5 mass %, and most preferably at least 1 mass %. In addition, use at a content of not more than 70 mass % is preferred; use at a content of not more than 50 mass % is more preferred; use at a content of not more than 30 mass % is particularly preferred; and use at a content of not more than 20 mass % is most preferred.

[1-4. Cyclic Sulfate Ester]

Examples of the cyclic sulfate ester include the following:
alkylene sulfate compounds such as 1,2-ethylene sulfate, 1,2-propylene sulfate, 1,3-propylene sulfate, 1,2-butylene sulfate, 1,3-butylene sulfate, 1,4-butylene sulfate, 1,2-pentylene sulfate, 1,3-pentylene sulfate, 1,4-pentylene sulfate, and 1,5-pentylene sulfate.

The content of the cyclic sulfate ester, with reference to the entire non-aqueous electrolyte solution, is preferably at least 0.01 mass %, more preferably at least 0.1 mass %, and most preferably at least 0.5 mass %. Use at a content of not more than 5 mass % is preferred; use at a content of not more than 4 mass % is more preferred; and use at not more than 3 mass % is more preferred. By using the cyclic sulfate ester at the indicated content, sufficient improvements in the high-temperature storage characteristics and the cycle characteristics can be obtained, and in addition, undesirable increases in resistance can be suppressed.

[1-5. Other Compounds]

Examples of compounds that may also be used in the electrolyte solution of the present invention include by S═O bond-containing compounds other than cyclic sulfate esters, cyclic carbonates having a carbon-carbon double bond, halogen atom-containing chain carbonates, isocyanate group-containing compounds, compounds represented by formula (X), difluorophosphate salts, and dicarboxylate esters.

[1-5-1. S═O Bond-Containing Compounds Other than Cyclic Sulfate Esters]

The S═O bond-containing compounds other than cyclic sulfate esters are not particularly limited, and examples of the S═O bond-containing compounds other than cyclic sulfate esters include the following:
chain sulfonate esters, cyclic sulfonate esters, chain sulfate esters, chain sulfite esters, cyclic sulfite esters, chain sulfones, and cyclic sulfones. Among the preceding, chain sulfonate esters, cyclic sulfonate esters, and chain sulfate esters are preferred.

Examples of chain sulfonate esters include the following:
fluorosulfonate esters such as methyl fluorosulfonate and ethyl fluorosulfonate; methanesulfonate esters such as methyl methanesulfonate, ethyl methanesulfonate, 2-propynyl methanesulfonate, 3-butynyl methanesulfonate, busulfan, methyl 2-(methanesulfonyloxy)propionate, ethyl 2-(methanesulfonyloxy)propionate, 2-propynyl 2-(methanesulfonyloxy)propionate, 3-butynyl 2-(methanesulfonyloxy) propionate, methyl methanesulfonyloxyacetate, ethyl methanesulfonyloxyacetate, 2-propynyl methanesulfonyloxyacetate and 3-butynyl methanesulfonyloxyacetate, phenyl methanesulfonate, and pentafluorophenyl methanesulfonate;

alkenylsulfonate esters such as methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate, and 1,2-bis(vinylsulfonyloxy)ethane; and alkyl disulfonate esters such as methoxycarbonylmethyl methanedisulfonate, ethoxycarbonylmethyl methanedisulfonate, 1-methoxycarbonylethyl methanedisulfonate, 1-ethoxycarbonylethyl methanedisulfonate, methoxycarbonylmethyl 1,2-ethanedisulfonate, ethoxycarbonylmethyl 1,2-ethanedisulfonate, 1-methoxycarbonylethyl 1,2-ethanedisulfonate, 1-ethoxycarbonylethyl 1,2-ethanedisulfonate, methoxycarbonylmethyl 1,3-propanedisulfonate, ethoxycarbonylmethyl 1,3-propanedisulfonate, 1-methoxycarbonylethyl 1,3-propanedisulfonate, 1-ethoxycarbonylethyl 1,3-propanedisulfonate, methoxycarbonylmethyl 1,3-butanedisulfonate, ethoxycarbonylmethyl 1,3- butanedisulfonate, 1-methoxycarbonylethyl 1,3-butanedisulfonate, and 1-ethoxycarbonylethyl 1,3-butanedisulfonate.

Examples of the cyclic sulfonate esters include the following:

sultone compounds such as 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sulftone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methy-1-propene-1,3-sultone, 1-methyl-2-propene-1,3-sultone, 2-methyl-2-propene-1,3-sultone, 3-methyl-2-propene-1,3-sultone, 1,4-butane sultone, and 1,5-pentane sultone; and disulfonate compounds such as methylene methanedisulfonate and ethylene methanedisulfonate.

Examples of the chain sulfate esters include the following:

dialkyl sulfate compounds such as dimethyl sulfate, ethyl methyl sulfate, and diethyl sulfate.

Examples of the chain sulfite esters include the following:

dialkyl sulfite compounds such as dimethyl sulfite, ethyl methyl sulfite, and diethyl sulfite.

Examples of the cyclic sulfite esters include the following:

alkylene sulfite compounds such as 1,2-ethylene sulfite, 1,2-propylene sulfite, 1,3-propylene sulfite, 1,2-butylene sulfite, 1,3-butylene sulfite, 1,4-butylene sulfite, 1,2-pentylene sulfite, 1,3-pentylene sulfite, 1,4-pentylene sulfite, and 1,5-pentylene sulfite.

Examples of the chain sulfones include the following:

dialkyl sulfone compounds such as dimethyl sulfone and diethyl sulfone.

Examples of the cyclic sulfones include the following:

alkylene sulfone compounds such as sulfolane, methylsulfolane and 4,5-dimethylsulfolane; and alkenylene sulfone compounds such as sulfolene.

Among the preceding, methyl 2-(methanesulfonyloxy) propionate, ethyl 2-(methanesulfonyloxy)propionate, 2-propynyl 2-(methanesulfonyloxy)propionate, 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propane sultone, 1-propene-1,3-sultone, 1,4-butane sultone, 1,2-ethylene sulfate, 1,2-ethylene sulfite, methyl methanesulfonate and ethyl methanesulfonate, and pentafluorophenyl methanesulfonate are preferred from the standpoint of the storage characteristics, while 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propane sultone, 1-propene-1,3-sultone, 1,2-ethylene sulfate, and 1,2-ethylene sulfite are more preferred and 1,3-propane sultone and 1-propene-1,3-sultone are still more preferred. A single one of these may be used alone or two or more may be used in combination.

The content of the S=O bond-containing compound other than a cyclic sulfate ester, with reference to the entire non-aqueous electrolyte solution, is preferably at least 0.01 mass %, more preferably at least 0.1 mass %, and most preferably at least 0.5 mass %. In addition, use in a content of not more than 5 mass % is preferred; use in a content of not more than 4 mass % is more preferred; and use at not more than 3 mass % is most preferred. By using the S=O bond-containing compound other than a cyclic sulfate ester at the indicated content, sufficient improvements in the high-temperature storage characteristics and the cycle characteristics can be obtained, and in addition, undesirable increases in resistance can be suppressed.

[1-5-2. Cyclic Carbonates Having a Carbon-Carbon Double Bond]

Examples of cyclic carbonates having a carbon-carbon double bond include vinylene carbonate compounds such as vinylene carbonate, methylvinylene carbonate, ethylvinylene carbonate, 1,2-dimethylvinylene carbonate, 1,2-diethylvinylene carbonate, fluorovinylene carbonate, and trifluoromethylvinylene carbonate; vinylethylene carbonate compounds such as vinylethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, and 1,2-divinylethylene carbonate; and methylene ethylene carbonate compounds such as 1,1-dimethyl-2-methylene ethylene carbonate and 1,1-diethyl-2-methylene ethylene carbonate. A single one of these may be used alone or two or more may be used in combination.

When a cyclic carbonate compound having a carbon-carbon double bond is incorporated, its content in the non-aqueous electrolyte solution is generally at least 0.01 mass %, preferably at least 0.1 mass %, and more preferably at least 0.3 mass % and is generally not more than 10 mass %, preferably not more than 8 mass %, and more preferably not more than 6 mass %. The content of the cyclic carbonate compound having a carbon-carbon double bond is preferably brought into the indicated range because this not only improves the cycle characteristics, but also particularly improves the battery characteristics, e.g., gas generation can be suppressed and the internal resistance can be lowered.

[1-5-3. Halogen Atom-Containing Chain Carbonates]

There are no particular limitations on the halogen atom-containing chain carbonates, and the following are provided as examples.

Examples of the halogen atom in the halogen atom-containing chain carbonate include the fluorine atom, chlorine atom, bromine atom, and iodine atom, whereamong the fluorine atom and chlorine atom are preferred and the fluorine atom is particularly preferred.

Examples of fluorine atom-containing chain carbonates include fluoromethyl methyl carbonate, difluoromethyl methyl carbonate, trifluoromethyl methyl carbonate, trifluoroethyl methyl carbonate, and bis(trifluoroethyl) carbonate. Among the preceding, trifluoroethyl methyl carbonate and bis(trifluoroethyl) carbonate are preferred because they readily form a stable film and the stability of these compounds is also high.

The content of the halogen atom-containing chain carbonate is preferably at least 0.01 mass %, more preferably at least 0.1 mass %, and most preferably at least 0.5 mass %. In addition, use at a content of not more than 70 mass % is preferred; use at a content of not more 60 mass % is more preferred; and use at not more than 50 mass % is most preferred. By using the halogen atom-containing chain carbonate at the indicated content, sufficient improvements in the high-temperature storage characteristics and the cycle characteristics can be obtained, and in addition, undesirable gas generation can be suppressed.

[1-5-4. Isocyanate Group (N=C=O Group)-Containing Compounds]

There are no particular limitations on the isocyanate group (N=C=O group)-containing compounds, and the following are provided as examples.

Examples of isocyanate group-containing organic compounds include organic compounds that contain one isocyanate group, e.g., methyl isocyanate, ethyl isocyanate, propyl isocyanate, isopropyl isocyanate, butyl isocyanate, tertiary-butyl isocyanate, pentyl isocyanate, hexyl isocyanate, cyclohexyl isocyanate, vinyl isocyanate, allyl isocyanate, ethynyl isocyanate, propargyl isocyanate, phenyl isocyanate and fluorophenyl isocyanate; and organic compounds that contain two isocyanate groups such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate, and 2,4,4-trimethylhexamethylene diisocyanate.

Among the preceding, organic compounds that contain two isocyanate groups such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, and 2,4,4-trimethylhexamethylene diisocyanate, are preferred from the standpoint of enhancing the storage characteristics, while hexamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, and 2,4,4-trimethylhexamethylene diisocyanate are more preferred and 1,3-bis(isocyanatomethyl)cyclohexane, dicyclohexylmethane-4,4'-diisocyanate, bicyclo[2.2.1]heptan-2,5-diylbis(methyl isocyanate), and bicyclo[2.2.1]heptan-2,6-diylbis(methyl isocyanate) are even more preferred. A single one of these may be used alone or two or more may be used in combination.

The content of the isocyanate group (N=C=O group)-containing compound is preferably at least 0.01 mass %, more preferably at least 0.1 mass %, and most preferably at least 0.2 mass %. In addition, use at a content of not more than 5 mass % is preferred; use at a content of not more than 3 mass % is more preferred; and use at not more than 2 mass % is most preferred. By using the isocyanate group (N=C=O group)-containing compound at the indicated content, sufficient improvements in the high-temperature storage characteristics and the cycle characteristics can be obtained, and in addition, undesirable increases in resistance can be suppressed.

[1-5-5. Compound Represented by Formula (X)]

[C3]

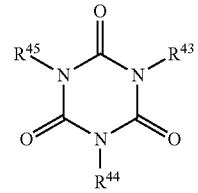

(X)

($R^{43}$, $R^{44}$, and $R^{45}$ each independently represent an organic group that may have a halogen atom, cyano group, ester group, or ether group.)

Examples of the halogen atom represented by $R^{43}$, $R^{44}$, and $R^{45}$ include the fluorine atom, chlorine atom, bromine atom, and iodine atom, wherein the fluorine atom is most preferred among these due to its large effect with regard to improving the battery characteristics. Examples of the organic group possibly having a halogen atom, cyano group, ester group, or ether group include hydrocarbon groups such as methyl group, ethyl group, propyl group, isopropyl group, butyl group, isobutyl group, t-butyl group, t-amyl group, vinyl group, allyl group, 1-propenyl group, 1-butenyl group, ethynyl group, propynyl group, phenyl group, 2-tolyl group, 3-tolyl group, 4-tolyl group, benzyl group, 4-t-butylphenyl group, and 4-t-amylphenyl group; fluorinated hydrocarbon groups such as the fluoromethyl group, trifluoromethyl group, and trifluoroethyl group; cyanohydrocarbon groups such as the cyanomethyl group, cyanoethyl group, cyanopropyl group, cyanobutyl group, cyanopentyl group, and cyanohexyl group; ester group-containing organic groups such as the ethoxycarbonyl group, ethoxycarbonylmethyl group, 1-ethoxycarbonylethyl group, acetoxy group, acetoxymethyl group, 1-acetoxyethyl group, acryloyl group, acryloylmethyl group, and 1-acryloylethyl group; and ether group-containing organic groups such as the methoxy group, ethoxy group, methoxymethyl group, ethoxymethyl group, methoxyethyl group, and ethoxyethyl group.

Examples of the compound represented by formula (X) include the following: trivinyl isocyanurate, tri(1-propenyl) isocyanurate, triallyl isocyanurate, trimethallyl isocyanurate, methyl diallyl isocyanurate, ethyl diallyl isocyanurate, diethyl allyl isocyanurate, diethyl vinyl isocyanurate, tri(propargyl) isocyanurate, tris(2-acryloxymethyl) isocyanurate, tris(2-acryloxyethyl) isocyanurate, tris(2-methacryloxymethyl) isocyanurate, tris(2-methacryloxyethyl) isocyanurate, and ε-caprolactone-modified tris-(2-acryloxyethyl) isocyanurate, among which triallyl isocyanurate, trimethallyl isocyanurate, tris(2-acryloxyethyl) isocyanurate, tris(2-methacryloxyethyl) isocyanurate, and ε-caprolactone-modified tris-(2-acryloxyethyl) isocyanurate are preferred and triallyl isocyanurate and tris(2-acryloxyethyl) isocyanurate are particularly preferred for their large enhancing effect on the cycle characteristics. A single one of these may be used alone or two or more may be used in combination.

The content of the compound represented by formula (X), with reference to the entire non-aqueous electrolyte solution, is preferably at least 0.01 mass %, more preferably at least 0.1 mass %, and most preferably at least 0.2 mass %. Use at a content of not more than 5 mass % is preferred; use at a content of not more than 3 mass % is more preferred; and use at not more than 2 mass % is most preferred. By using the compound represented by formula (X) at the indicated content, sufficient improvements in the high-temperature storage characteristics and the cycle characteristics can be obtained, and in addition, undesirable increases in resistance can be suppressed.

[1-5-6. Monofluorophosphate Salts and Difluorophosphate Salts]

There are no particular limitations on the monofluorophosphate salts and difluorophosphate salts, and the following are provided as examples:

lithium difluorophosphate, sodium difluorophosphate, potassium difluorophosphate, and ammonium difluorophosphate, whereamong lithium difluorophosphate is particularly preferred for its large effect with regard to enhancing the cycle characteristics. A single one of these may be used alone, or two or more may be used in combination.

The content of the difluorophosphate salt, with reference to the entire non-aqueous electrolyte solution, is preferably at least 0.01 mass %, more preferably at least 0.1 mass %, and most preferably at least 0.2 mass %. In addition, use at a content of not more than 3 mass % is preferred; use at a content of not more than 2 mass % is more preferred; and use at not more than 1.5 mass % is most preferred. By using the difluorophosphate salt at the indicated content, sufficient improvements in the high-temperature storage characteristics and the cycle characteristics can be obtained, and in addition, undesirable gas generation can be suppressed.

[1-5-7. Dicarboxylate Esters]

There are no particular limitations on the dicarboxylate esters, and the following are provided as examples:

malonate esters and derivatives thereof, succinate esters and derivatives thereof, adipate esters and derivatives thereof, fumarate esters and derivatives thereof, maleate esters and derivatives thereof, phthalate esters and derivatives thereof, and terephthalate esters and derivatives thereof.

Examples of the malonate esters and derivatives thereof include the following:

dimethyl malonate, diethyl malonate, diethyl methylmalonate, diethyl ethylmalonate, diethyl butylmalonate, divinyl malonate, diallyl malonate, and dipropargyl malonate.

Examples of the succinate esters and derivatives thereof include the following:

dimethyl succinate, diethyl succinate, diethyl methylsuccinate, diethyl dimethylsuccinate, diethyl tetramethylsuccinate, divinyl succinate, diallyl succinate, and dipropargyl succinate.

Examples of the adipate esters and derivatives thereof include the following:

dimethyl adipate, diethyl adipate, diethyl methyladipate, diethyl dimethyladipate, diethyl tetramethyladipate, divinyl adipate, diallyl adipate, and dipropargyl adipate.

Examples of the fumarate esters and derivatives thereof include the following:

dimethyl fumarate, diethyl fumarate, and diethyl methylfumarate.

Examples of the maleate esters and derivatives thereof include the following:

dimethyl maleate, diethyl maleate, and diethyl methylmaleate.

Examples of the phthalate esters and derivatives thereof include the following:

dimethyl phthalate, diethyl phthalate, and di-2-ethylhexyl phthalate.

Examples of the terephthalate esters and derivatives thereof include the following:

dimethyl terephthalate, diethyl terephthalate, and di-2-ethylhexyl terephthalate.

Among the preceding, diethyl methylmalonate, diethyl ethylmalonate, and diethyl butylmalonate provide a large improvement in the high-temperature storage characteristics and for this reason are particularly preferred. A single one of these may be used alone or two or more may be used in combination.

The content of the dicarboxylate ester, with reference to the entire non-aqueous electrolyte solution, is preferably at least 0.01 mass %, more preferably at least 0.1 mass %, and most preferably at least 0.5 mass %. In addition, use at a content of not more than 5 mass % is preferred; use at a content of not more than 4 mass % is more preferred; and use at not more than 3 mass % is most preferred. By using the dicarboxylate ester at the indicated content, sufficient improvement in the high-temperature storage characteristics can be obtained, and in addition, undesirable reductions in the cycle characteristics can be suppressed.

[1-6. Electrolyte]

There are no limitations on the electrolyte used in the non-aqueous electrolyte solution of the present invention, and any known electrolyte that is used as an electrolyte in the target non-aqueous electrolyte secondary battery can be adopted. A lithium salt is generally used as the electrolyte when the non-aqueous electrolyte solution of the present invention is used in a lithium secondary battery.

Specific examples of the electrolyte include inorganic lithium salts, such as $LiClO_4$, $LiAsF_6$, $LiPF_6$, $LiBF_4$, $LiSbF_6$, $LiSO_3F$, and $LiN(FSO_2)_2$;

fluorine-containing organic lithium salts, such as $LiCF_3SO_3$, $LiN(FSO_2)(CF_3SO_2)$, $LiN(CF_3SO_2)_2$, $LiN(C_2F_5SO_2)_2$, lithium cyclo-1,3-hexafluoropropanedisulfonylimide, lithium cyclo-1,2-tetrafluoroethanedisulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and lithium salts of dicarboxylic acid-containing complexes, such as lithium bis(oxalato)borate, lithium difluorooxalatoborate, lithium tris(oxalato)phosphate, lithium difluorobis(oxalato)phosphate, and lithium tetrafluoro(oxalato)phosphate.

Among the preceding, $LiPF_6$, $LiBF_4$, $LiSO_3F$, $LiN(FSO_2)_2$, $LiN(FSO_2)(CF_3SO_2)$, $LiN(CF_3SO_2)_2$, $LiN(C_2F_5SO_2)_2$, lithium bis(oxalato)borate, lithium difluorooxalatoborate, lithium tris(oxalato)phosphate, lithium difluorobis(oxalato)phosphate, and lithium tetrafluoro(oxalato)phosphate are preferred from the standpoints of the solubility and degree of dissociation in the non-aqueous solvent, the electrical conductivity, and the resulting battery characteristics, with $LiPF_6$ and $LiBF_4$ being particularly preferred.

A single electrolyte may be used alone, or two or more may be used together in any combination with any proportions. Among the preceding, the co-use of two specific inorganic lithium salts, or the co-use of an inorganic lithium salt with a fluorine-containing organic lithium salt, is preferred because this inhibits gas generation during trickle charging and suppresses deterioration during high-temperature storage. The co-use of $LiPF_6$ with $LiBF_4$ and the co-use of an inorganic lithium salt, e.g., $LiPF_6$ and $LiBF_4$ with a fluorine-containing organic lithium salt, e.g., $LiCF_3SO_3$, $LiN(CF_3SO_2)_2$ and $LiN(C_2F_5SO_2)_2$ are particularly preferred.

Moreover, when $LiPF_6$ is used in combination with $LiBF_4$, the $LiBF_4$ is preferably present in a proportion, with reference to the entire electrolyte, generally of at least 0.01 mass % and not more than 50 mass %. This proportion is preferably at least 0.05 mass % and more preferably at least 0.1 mass %, and, on the other hand, is preferably not more than 20 mass %, more preferably not more than 10 mass %, particularly preferably not more than 5 mass %, and most preferably not more than 3 mass %. By having this proportion be in the indicated range, the desired effects are readily obtained and the increase in the resistance of the electrolyte solution due to the low degree of dissociation of $LiBF_4$ is suppressed.

When, on the other hand, an inorganic lithium salt such as $LiPF_6$ or $LiBF_4$ is used in combination with an inorganic lithium salt such as $LiSO_3F$ or $LiN(FSO_2)_2$, and/or with a fluorine-containing organic lithium salt such as $LiCF_3SO_3$, $LiN(CF_3SO_2)_2$, $LiN(C_2F_5SO_2)_2$, lithium cyclo-1,3-hexafluoropropanedisulfonylimide, lithium cyclo-1,2-tetrafluoroethanedisulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, or $LiBF_2(C_2F_5SO_2)_2$, and/or with a lithium salt of a dicarboxylic acid-containing complex such as lithium bis(oxalato)borate, lithium tris(oxalato)phosphate, lithium difluorooxalatoborate, lithium tri(oxalato)phosphate, lithium difluorobis(oxalato)phosphate, or lithium tetrafluoro(oxalato)phosphate, the proportion of the inorganic lithium salt in the entire electrolyte in such a case is generally at least 70 mass %, preferably at least 80 mass %, and more preferably at least 85 mass % and is generally not more than 99 mass % and preferably not more than 95 mass %.

The concentration of the lithium salt in the non-aqueous electrolyte of the present invention may be any concentration at which the gist of the present invention is not impaired, but is generally at least 0.5 mol/L and is preferably at least 0.6 mol/L and is more preferably at least 0.8 mol/L. In addition, it is in the range of generally not more than 3 mol/L and preferably not more than 2 mol/L, more preferably not more than 1.8 mol/L, and still more preferably not more than 1.6 mol/L. By having the lithium salt concentration be in the indicated range, provides a sufficient electrical conductivity for the non-aqueous electrolyte solution and in addition suppresses the decline in electrical conductivity due to an increased viscosity and suppresses reductions in the performance of non-aqueous electrolyte secondary batteries that use the non-aqueous electrolyte solution of the present invention.

[1-7. Non-Aqueous Solvent]

A suitable selection from among the non-aqueous solvents heretofore known as solvents for non-aqueous electrolyte solutions can be used as the non-aqueous solvent present in the non-aqueous electrolyte solution of the present invention.

Cyclic carbonates, chain carbonates, chain and cyclic carboxylate esters, chain ethers, phosphorus-containing organic solvents, sulfur-containing organic solvents, and fluorine-containing aromatic solvents are examples of the commonly used non-aqueous solvents.

Examples of the cyclic carbonates include cyclic carbonates such as ethylene carbonate, propylene carbonate, and butylene carbonate, and the number of carbons in the cyclic carbonate is generally at least 3 and not more than 6. Among the preceding, ethylene carbonate and propylene carbonate are preferred because, due to their high dielectric constants, the electrolyte readily undergoes dissolution and the cycle characteristics when used in a non-aqueous electrolyte secondary battery are excellent.

Examples of the chain carbonates include chain carbonates such as dimethyl carbonate, ethyl methyl carbonate, diethyl carbonate, methyl n-propyl carbonate, ethyl n-propyl carbonate, and di-n-propyl carbonate, and the number of carbons in the constituent alkyl groups is preferably at least 1 and not more than 5 and is particularly preferably at least 1 and not more than 4. Among the preceding, dimethyl carbonate, diethyl carbonate, and ethyl methyl carbonate are preferred from the standpoint of enhancing the battery characteristics. Additional examples are chain carbonates in which a portion of the hydrogen in the alkyl group is substituted by fluorine. Examples of the fluorine-substituted chain carbonates include bis(fluoromethyl) carbonate, bis (difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethyl methyl carbonate, 2,2-difluoroethyl methyl carbonate, and 2,2,2-trifluoroethyl methyl carbonate.

Examples of the chain carboxylate esters include methyl acetate, ethyl acetate, propyl acetate, isopropyl acetate, butyl acetate, sec-butyl acetate, isobutyl acetate, t-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate and chain carboxylate esters provided by substituting a portion of the hydrogen in the preceding compounds with fluorine. Examples of fluorine-substituted chain carboxylate esters include methyl trifluoroacetate, ethyl trifluoroacetate, propyl trifluoroacetate, butyl trifluoroacetate, and 2,2,2-trifluoroethyl trifluoroacetate. Among the preceding, methyl acetate, ethyl acetate, propyl acetate, butyl acetate, methyl propionate, ethyl propionate, propyl propionate, methyl butyrate, ethyl butyrate, methyl valerate, methyl isobutyrate, ethyl isobutyrate, and methyl pivalate are preferred from the standpoint of enhancing the battery characteristics.

Examples of the cyclic carbonate esters include γ-butyrolactone and γ-valerolactone and cyclic carbonate esters provided by the substitution of a portion of the hydrogen in these compounds by fluorine. γ-butyrolactone is more preferred among the preceding.

Examples of the chain ethers include dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane and chain ethers provided by substituting a portion of the hydrogen in these compounds with fluorine. Examples of the fluorine-substituted chain ethers include bis(trifluoroethoxy)ethane, ethoxytrifluoroethoxyethane, methoxytrifluoroethoxyethane, 1,1,1,2,2,3,4,5,5,5-decafluoro-3-methoxy-4-trifluoromethylpentane, 1,1,1,2,2,3,4,5,5,5-decafluoro-3-ethoxy-4-trifluoromethylpentane, 1,1,1,2,2,3,4,5,5,5-decafluoro-3-propoxy-4-trifluoromethylpentane, 1,1,2,2-tetrafluoroethyl-2,2,3,3-tetrafluoropropyl ether, and 2,2-difluoroethyl-2,2,3,3-tetrafluoropropyl ether. 1,2-dimethoxyethane and 1,2-diethoxyethane are more preferred among the preceding.

Examples of the phosphorus-containing organic solvents include trimethyl phosphate, triethyl phosphate, dimethylethyl phosphate, methyldiethyl phosphate, ethylenemethyl phosphate, ethyleneethyl phosphate, triphenyl phosphate, trimethyl phosphite, triethyl phosphite, triphenyl phosphite, trimethylphosphine oxide, triethylphosphine oxide, and triphenylphosphine oxide and phosphorus-containing organic solvents provided by substituting a portion of the hydrogen in the preceding compounds with fluorine. Examples of the fluorine-substituted phosphorus-containing organic solvents include tris(2,2,2-trifluoroethyl) phosphate and tris(2,2,3,3,3-pentafluoropropyl) phosphate.

Examples of the sulfur-containing organic solvents include sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate and sulfur-containing organic solvents provided by the substitution of a portion of the hydrogen in the preceding compounds with fluorine.

Examples of the fluorine-containing aromatic solvents include fluorobenzene, difluorobenzene, trifluorobenzene, tetrafluorobenzene, pentafluorobenzene, hexafluorobenzene, and benzotrifluoride.

Among these non-aqueous solvents, the use is preferred of ethylene carbonate and/or propylene carbonate, which are cyclic carbonates, and the co-use of these with a chain carbonate is even more preferred from the standpoint of enabling a low viscosity for the electrolyte solution to then coexist with a high conductivity for the electrolyte solution.

A single non-aqueous solvent may be used alone, or two or more may be used together in any combination with any proportions. For the case in which two or more are used together, for example, when a cyclic carbonate is used in combination with a chain carbonate, preferable content for the chain carbonate in the non-aqueous solvent is generally at least 20 volume % and preferably at least 40 volume % and is generally not more than 95 volume % and preferably not more than 90 volume %. On the other hand, preferable content for the cyclic carbonate in the non-aqueous solvent is generally at least 5 volume % and preferably at least 10 volume % and is generally not more than 80 volume % and preferably not more than 60 volume %. By having the proportion of the chain carbonate be in the indicated range, viscosity increases in the non-aqueous electrolyte solution are then suppressed and reductions in the electrical conductivity of the non-aqueous electrolyte solution due to a reduced dissociation of the lithium salt electrolyte are also suppressed. In this Description, the volume of the non-aqueous solvent is the value measured at 25° C., while for a non-aqueous solvent that is a solid at 25° C., such as ethylene carbonate, the value measured at the melting point is used.

[1-8. Other Additives]

Various additives may be incorporated in the non-aqueous electrolyte solution of the present invention in a range in which the effects of the present invention are not significantly impaired. Any heretofore known additive may be used. A single additive may be used, or two or more may be used together in any combination with any proportions.

(Overcharge Inhibitor)

Specific examples of the overcharge inhibitor include the following: alkylbiphenyls such as 2-methylbiphenyl and 2-ethylbiphenyl; aromatic compounds such as terphenyl and partially hydrogenated terphenyl, cyclopentylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, diphenyl ether, dibenzofuran, ethyl phenyl carbonate, tris(2-t-amylphenyl) phosphate, tris(3-t-amylphenyl) phosphate, tris(4-t-amylphenyl) phosphate, tris (2-cyclohexylphenyl) phosphate, tris(3-cyclohexylphenyl) phosphate, tris(4-cyclohexylphenyl) phosphate, triphenyl phosphate, tritolyl phosphate, tri(t-butylphenyl) phosphate, methyl phenyl carbonate, and diphenyl carbonate; partially fluorinated aromatic compounds such as 2-fluorobiphenyl, 3-fluorobiphenyl, 4-fluorobiphenyl, 4,4'-difluorobiphenyl, 2,4-difluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difluoroanisole, and 3,5-difluoroanisole.

The content of this overcharge inhibitor in the non-aqueous electrolyte solution is generally at least 0.1 mass % and is preferably at least 0.2 mass %, more preferably at least 0.3 mass %, and even more preferably at least 0.5 mass %, and is generally not more than 5 mass % and is preferably not more than 3 mass % and more preferably not more than 2 mass %. By having the concentration be in the indicated range, the desired effects of the overcharge inhibitor are then readily exhibited and reductions in the battery characteristics, e.g., the high-temperature storage characteristics, are also suppressed. Overcharging-induced rupture of the non-aqueous electrolyte secondary battery can be suppressed and the stability of the non-aqueous electrolyte secondary battery is improved by incorporating an overcharge inhibitor in the non-aqueous electrolyte solution, which is therefore preferred.

Examples of other auxiliaries include carbonate compounds such as erythritan carbonate, spirobisdimethylene carbonate, methoxyethyl methyl carbonate, methoxyethyl ethyl carbonate, ethoxyethyl methyl carbonate, and ethoxyethyl ethyl carbonate; spiro compounds such as 2,4,8,10-tetraoxaspiro[5.5]undecane and 3,9-divinyl-2,4,8,10-tetraoxaspiro[5.5]undecane; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, nonane, decane, cycloheptane, methylcyclohexane, ethylcyclohexane, propylcyclohexane, n-butylcyclohexane, t-butylcyclohexane, and dicyclohexyl; phosphorus-containing compounds such as methyl dimethylphosphinate, ethyl dimethylphosphinate, ethyl diethylphosphinate, trimethyl phosphonoformate, triethyl phosphonoformate, trimethyl phosphonoacetate, triethyl phosphonoacetate, trimethyl-3-phosphonopropionate, and triethyl-3-phosphonopropionate; and acid anhydrides such as succinic anhydride, methylsuccinic anhydride, 4,4-dimethylsuccinic anhydride, 4,5-dimethylsuccinic anhydride, maleic anhydride, citraconic anhydride, dimethylmaleic anhydride, phenylmaleic anhydride, diphenylmaleic anhydride, phthalic anhydride, cyclohexane-1,2-dicarboxylic anhydride, acetic anhydride, propionic anhydride, acrylic anhydride, and methacrylic anhydride. Among these, succinic anhydride, maleic anhydride, and methacrylic anhydride are preferred from the standpoints of enhancing the cycle characteristics and enhancing the high-temperature storage characteristics. A single one of these may be used alone or two or more may be used in combination.

The content of this auxiliary in the non-aqueous electrolyte solution is not particularly limited, but is generally at least 0.01 mass %, preferably at least 0.1 mass %, and more preferably at least 0.2 mass % and is generally not more than 8 mass %, preferably not more than 5 mass %, more preferably not more than 3 mass %, and even more preferably not more than 2 mass %. The addition of this auxiliary is preferred from the standpoint of enhancing the capacity retention characteristics after high-temperature storage and enhancing the cycle characteristics. By having this concentration be in the indicated range, the effect of the auxiliary is then readily exhibited and reductions in the battery characteristics, e.g., the high-rate discharge characteristics (high-rate discharge), are suppressed.

[2. Non-Aqueous Electrolyte Secondary Battery]

The non-aqueous electrolyte secondary battery that is an embodiment of the present invention is provided with a positive electrode having a positive electrode active material capable of absorbing and releasing a metal ion, and a negative electrode having a negative electrode active material capable of absorbing and releasing a metal ion, wherein the non-aqueous electrolyte secondary battery contains the non-aqueous electrolyte solution of the present invention.

[2-1. Non-Aqueous Electrolyte Solution]

The non-aqueous electrolyte solution of the present invention as described above is used for the non-aqueous electrolyte solution. Within a range that does not depart from the intent of the present invention, another non-aqueous electrolyte solution may be used mixed with the non-aqueous electrolyte solution of the present invention.

[2-2. Negative Electrode]

Known art can be used for the materials and construction of the negative electrode and for its method of production; specifically, for example, the teachings in the known literature, e.g., WO 2012/053485 and Japanese Patent Application Laid-open No. 2014-209479, can be adopted.

<Negative Electrode Active Material>

The negative electrode active material should have the ability to electrochemically store and discharge a metal ion, e.g., the lithium ion, but is not otherwise particularly limited. Specific examples are carbonaceous materials, alloy materials, and lithium-containing composite metal oxide materials. A single one of these may be used alone or two or more may be used together in any combination. In specific terms, for example, the teachings in the known literature, e.g., WO 2012/053485 and Japanese Patent Application Laid-open No. 2014-209479, can be adopted.

<Constitution and Method of Production of the Negative Electrode>

Any known method can be used to produce the electrode as long as the effects of the present invention are not significantly impaired. For example, formation can be carried out by making a slurry by adding a binder and a solvent, and as necessary a thickener, electroconductive material, filler, and so forth, to the negative electrode active material; coating this on a current collector; drying, and then pressing.

Moreover, when an alloy material is used, a method may also be used in which a thin film layer containing the aforementioned negative electrode active material (negative electrode active material layer) is formed by a procedure such as vapor deposition, sputtering, and plating.

(Electrode Density)

There are no particular limitations on the electrode construction when the negative electrode active material is converted into the electrode, but the density of the negative electrode active material present on the current collector is preferably at least 1 g·cm$^{-3}$, more preferably at least 1.2 g cm$^{-3}$, and particularly preferably at least 1.3 g·cm$^{-3}$ and is preferably not more than 2.2 g·cm$^{-3}$, more preferably not more than 2.1 g·cm$^{-3}$, still more preferably not more than 2.0 g cm$^{-3}$, and particularly preferably not more than 1.9 g·cm$^{-3}$. When the density of the negative electrode active material present on the current collector is above the indicated range, the negative electrode active material particles are fractured and an increase in the initial irreversible capacity may occur, and/or a deterioration in the high-current density charge/discharge characteristics may be caused by a reduction in the permeability of the non-aqueous electrolyte solution to the neighborhood of the current collector/negative electrode active material interface. At below the aforementioned range, the electroconductivity within the negative electrode active material may decline and the battery resistance may be increased and the capacity per unit volume may be reduced.

[2-3. Positive Electrode]

Known art can be used for the materials and construction of the positive electrode and for its method of production; specifically, for example, the teachings in the known literature, e.g., WO 2012/053485 and Japanese Patent Application Laid-open No. 2014-209479, can be adopted.

<Positive Electrode Active Material>

The positive electrode active material (lithium transition metal compound) used in the positive electrode is described in the following.

<Lithium Transition Metal Compound>

The lithium transition metal compound is a compound that has a structure capable of the release and insertion of the Li ion and examples of the lithium transition metal compound include sulfides, phosphate salt compounds, and lithium transition metal composite oxides. Known art can also be used for its composition and so forth, and specifically, for example, the teachings in the known literature, e.g., WO 2012/053485 and Japanese Patent Application Laid-open No. 2014-209479, can be adopted.

<Construction of and Fabrication Method for a Positive Electrode for a Lithium Secondary Battery>

The positive electrode for a lithium secondary battery is made by forming, on a current collector, a positive electrode active material layer that contains a binder and a powder of a lithium transition metal compound for use as a positive electrode material for a lithium secondary battery as described above.

The positive electrode active material layer generally is fabricated by dry mixing the positive electrode material and a binder with an electroconductive material, thickener, and so forth used on an optional basis, followed by conversion into sheet form and press-bonding this onto a positive electrode current collector, or is fabricated by converting these materials into a slurry by dissolving or dispersing them in a liquid medium and then coating this on a positive electrode current collector and drying. Known art can be used for the materials of the positive electrode active material layer, and specifically, for example, the teachings in the known literature, e.g., WO 2012/053485 and Japanese Patent Application Laid-open No. 2014-209479, can be adopted.

[2-4. Separator]

A separator is generally interposed between the positive electrode and negative electrode in order to prevent short circuiting. In this case, the non-aqueous electrolyte solution of the present invention is generally used impregnated in the separator.

The material and shape of the separator are not particularly limited and any known material and shape can be adopted as long as the effects of the present invention are not significantly impaired. In particular, resins, glass fibers, and inorganic materials, which is formed from a material stable in the non-aqueous electrolyte solution of the present invention are used, and those in a form of porous sheet or a nonwoven fabric excellent in liquid retentivity are preferably used.

Known art can be used for the materials of a resin or glass fiber separator, and specifically, for example, the teachings in the known literature, e.g., WO 2012/053485 and Japanese Patent Application Laid-open No. 2014-209479, can be adopted.

[2-5. Battery Design]

<Electrode Group>

The electrode group may have either a structure in which the aforementioned positive electrode sheet is stacked with the negative electrode sheet with the aforementioned separator interposed therebetween, or a structure in which the aforementioned positive electrode sheet and negative electrode sheet are wound, with the separator interposed therebetween, into a coil form. The proportion of the volume of the electrode group to the internal volume of a battery (referred to below as the electrode group occupancy ratio) is generally at least 40% and is preferably at least 50% and is generally not more than 90% and preferably not more than 80%.

The battery has a low capacity when the electrode group occupancy ratio is below the indicated range. In addition, there is little empty space when the indicated range is exceeded, and the internal pressure may then increase when, due to the battery assuming high temperatures, components undergo swelling and/or the vapor pressure of the liquid components of the electrolyte increases. Battery characteristics, such as the repetitive charge/discharge performance and the high-temperature storability, may then decline and the gas release valve, which releases the internal pressure to the outside, may also operate.

<Outer Case>

The material of the outer casing does not have any particular limitation as long as it is a material stable against a non-aqueous electrolyte solution to be used. Specifically, a metal such as a nickel-plated steel plate, stainless steel, aluminum or an aluminum alloy, and a magnesium alloy, or a film of a lamination of resin and aluminum foil (laminated film) is used. From the viewpoint of weight reduction, a metal such as aluminum or an aluminum alloy, or the laminated film is preferably used.

Examples of outer cases that use a metal include those with a sealed structure provided by metal-to-metal welding by laser welding, resistance welding, or ultrasonic welding, and those with a crimped structure that uses the aforementioned metals and an interposed resin gasket. Examples of outer cases that use a laminate film as described above include those having a sealed structure provided by hot melt-bonding between resin layers. In order to improve the seal, a resin different from the resin used in the laminate film may be interposed between the resin layers. In particular, since metal-to-resin bonding is involved in the case of a sealed structure provided by the hot melt-bonding of resin layers with a current collector terminal disposed therebetween, it is then advantageous to use, as the interposed resin, a polar group-bearing resin or a modified resin into which polar groups have been introduced.

<Protective Elements>

The following, for example, can be used as protective elements: PTC (Positive Temperature Coefficient), thermal fuses, and thermistors, whereby the resistance increases during abnormal heating or the passage of an overcurrent, and a valve (current cutoff valve) that shuts off the current flowing through the circuit in the event of a sharp increase in the battery internal pressure or internal temperature during abnormal heating. A protective element is preferably selected that does not operate under normal high-current use, while more preferably a design is elaborated that is not subject to abnormal heating or thermal runaway even in the absence of a protective element.

<Outer Body>

The non-aqueous electrolyte secondary battery of the present invention is generally constituted by housing the aforementioned non-aqueous electrolyte solution, negative electrode, positive electrode, separator, and so forth within an outer body. There are no particular limitations on this outer body and any known outer body can be adopted insofar as the effects of the present invention are not significantly impaired. Specifically, while the material of the outer body may be freely selected, generally, for example, nickel-plated iron, stainless steel, aluminum or an alloy thereof, nickel, titanium, and so forth is used.

The shape of the outer body may also be freely selected, and, for example, may be any of a cylindrical shape, rectangular shape, laminate shape, coin shape, large scale, and so forth.

<Battery Voltage>

The non-aqueous electrolyte secondary battery of the present invention is generally used at a battery voltage of at least 4.3 V. The battery voltage is preferably at least 4.3 V, more preferably at least 4.35 V, and most preferably at least 4.4 V. Increased battery voltages are sought because this makes it possible to increase the energy density of the battery. On the other hand, when the battery voltage is increased, the potential at the positive electrode is increased and this may cause the problem of an increase in secondary reactions at the positive electrode surface. The above problem can be solved by using the electrolyte solution and battery of the present invention; however, when the voltage becomes too high, the extent of the secondary reactions at the positive electrode surface becomes too excessive and the battery characteristics then deteriorate. Thus, the upper limit on the battery voltage is preferably equal to or less than 5 V, more preferably equal to or less than 4.8 V, and most preferably equal to or less than 4.6 V.

EXAMPLES

The present invention is more specifically described using the examples and comparative examples provided below, but the present invention is not limited to or by these examples as long as its gist is not exceeded.

Preparation of Non-Aqueous Electrolyte Solutions

Example 1-1

Operating under a dry argon atmosphere, $LiPF_6$ was dissolved to give 1.2 M in a non-aqueous solvent prepared by mixing ethylene carbonate (EC below), ethyl methyl carbonate (EMC below), and diethyl carbonate (DEC below) at, respectively, 30 volume %, 40 volume %, and 30 volume %, and 2 mass % of vinylene carbonate and 2 mass % of fluoroethylene carbonate were added. This electrolyte solution is designated reference electrolyte solution 1.

The non-aqueous electrolyte solution used in Example 1-1 was prepared by the further addition of 1.0 mass % of tetrahydropyran and 1.0 mass % of adiponitrile to reference electrolyte solution 1.

The non-aqueous electrolyte solution used in Example 1-2 was prepared by the further addition of 2.0 mass % of tetrahydropyran and 1.0 mass % of adiponitrile to reference electrolyte solution 1.

The non-aqueous electrolyte solution used in Example 1-3 was prepared by the further addition of 3.5 mass % of tetrahydropyran and 3.5 mass % of adiponitrile to reference electrolyte solution 1.

The non-aqueous electrolyte solution used in Example 1-4 was prepared by the further addition of 6.0 mass % of tetrahydropyran and 1.0 mass % of adiponitrile to reference electrolyte solution 1.

Reference electrolyte solution 1 was used as such in Comparative Example 1-1.

The non-aqueous electrolyte solution used in Comparative Example 1-2 was prepared by the further addition of 1.0 mass % of tetrahydropyran to reference electrolyte solution 1.

The non-aqueous electrolyte solution used in Comparative Example 1-3 was prepared by the further addition of 1.0 mass % of adiponitrile to reference electrolyte solution 1.

The non-aqueous electrolyte solution used in Comparative Example 1-4 was prepared by the further addition of 1.0 mass % of tetrahydropyran and 6.0 mass % of adiponitrile to reference electrolyte solution 1.

The non-aqueous electrolyte solution used in Comparative Example 1-5 was prepared by the further addition of 1.0 mass % of 1,3-dioxane and 1.0 mass % of adiponitrile to reference electrolyte solution 1.

The non-aqueous electrolyte solution used in Comparative Example 1-6 was prepared by the further addition of 1.0 mass % of 1,3-dioxolane and 1.0 mass % of adiponitrile to reference electrolyte solution 1.

The non-aqueous electrolyte solution used in Comparative Example 1-7 was prepared by the further addition of 11.0 mass % of tetrahydropyran and 1.0 mass % of adiponitrile to reference electrolyte solution 1.

The non-aqueous electrolyte solution used in Comparative Example 1-8 was prepared by the further addition of 1.0 mass % of tetrahydrofuran and 1.0 mass % of adiponitrile to reference electrolyte solution 1.

<Fabrication of Negative Electrode>

1 mass parts of an aqueous dispersion of sodium carboxymethyl cellulose and 1 mass parts of an aqueous dispersion of a styrene-butadiene rubber were added, as thickener and binder, respectively, to 98 mass parts of a graphite powder as the negative electrode active material, and mixing with a disperser was carried out to make a slurry. The obtained slurry was coated on one side of a copper foil followed by drying and pressing to fabricate a negative electrode. The fabricated negative electrode was used after drying under reduced pressure for 12 hours at 60° C.

<Fabrication of Positive Electrode>

1.6 mass parts of an electroconductive auxiliary and 1.6 mass parts of a binder (pVDF) were added to 96.8 mass parts of lithium cobaltate as the positive electrode active material, and mixing with a disperser was carried out to make a slurry. The obtained slurry was coated on both sides of an aluminum foil followed by drying and pressing to fabricate a positive electrode. The fabricated positive electrode was used after drying under reduced pressure for 12 hours at 80° C.

<Battery Fabrication>

A battery element was fabricated by stacking the aforementioned positive electrode, negative electrode, and a polyethylene separator in the following sequence: negative electrode, separator, positive electrode, separator, negative electrode. This battery element was inserted in a pouch made of a laminate film of a resin layer coated on both sides of aluminum (40 μm thickness), with the positive electrode and negative electrode terminals extending to the outside. This was followed by the introduction of 0.4 mL of the non-aqueous electrolyte solution into the pouch and vacuum sealing to fabricate a sheet battery. In order to increase contact between the electrodes, the sheet battery was then sandwiched between glass plates and pressure was applied.

<Property Evaluation Testing>

Test 1. Continuous Charging Test

The thusly fabricated battery was conditioned at 25° C. by charging to 4.4 V and discharging to 3 V until the capacity was stable. Then, the battery, charged to 4.4 V, was charged for 14 days in a 60° C. environment so as to hold at 4.4 V (continuous charging). The gas generation ratio (%), trickle capacity ratio (%), and residual capacity ratio (%) were measured at this point.

The amount of gas produced during continuous charging is determined using the Archimedes' method, and the gas generation ratio is taken to be the percentage (%) when the amount of gas in Comparative Example 1-1 (use of reference electrolyte solution 1) is made 100 (smaller numerical values for the gas generation ratio are better).

The value of the charging capacity due to the leakage current produced during the continuous charging test (this charging capacity is referred to as the trickle capacity in this Description) is determined, and the trickle capacity ratio (%) is taken to be the percentage (%) when the trickle capacity in Comparative Example 1-1 (use of reference electrolyte solution 1) is made 100 (smaller numerical values for the trickle capacity are better).

In addition, the value of the capacity is determined when, after continuous charging, discharge is carried out to 3 V at a current value of 0.2 C (this capacity is referred to as the residual capacity in this Description), and the residual capacity ratio is taken to be the percentage (%) when the residual capacity in Comparative Example 1-1 (use of reference electrolyte solution 1) is made 100 (larger numerical values for the residual capacity ratio are better).

TABLE 1

|  | Compound represented by formula (1) (mass %) | Nitrile compound (mass %) | Additional compound (mass %) | Gas generation ratio (%) | Trickle capacity ratio (%) | Residual capacity ratio (%) |
| --- | --- | --- | --- | --- | --- | --- |
| Example 1-1 | Tetrahydropyran (1.0) | Adiponitrile (1.0) | — | 5.4 | 39.7 | 129.3 |
| Example 1-2 | Tetrahydropyran (2.0) | Adiponitrile (1.0) | — | 3.1 | 37.9 | 142.3 |
| Example 1-3 | Tetrahydropyran (3.5) | Adiponitrile (3.5) | — | 6.9 | 31.1 | 110.7 |
| Example 1-4 | Tetrahydropyran (6.0) | Adiponitrile (1.0) | — | 2.6 | 50.4 | 118.4 |

TABLE 1-continued

| | Compound represented by formula (1) (mass %) | Nitrile compound (mass %) | Additional compound (mass %) | Gas generation ratio (%) | Trickle capacity ratio (%) | Residual capacity ratio (%) |
|---|---|---|---|---|---|---|
| Comparative Example 1-1 | — | — | — | 100.0 | 100.0 | 100.0 |
| Comparative Example 1-2 | Tetrahydropyran (1.0) | — | — | 134.0 | 121.1 | 0.0 |
| Comparative Example 1-3 | — | Adiponitrile (1.0) | — | 14.3 | 48.7 | 114.4 |
| Comparative Example 1-4 | Tetrahydropyran (1.0) | Adiponitrile (6.0) | — | 14.0 | 44.8 | 79.5 |
| Comparative Example 1-5 | — | Adiponitrile (1.0) | 1,3-dioxane (1.0) | 13.1 | 55.2 | 129.5 |
| Comparative Example 1-6 | — | Adiponitrile (1.0) | 1,3-dioxolane (1.0) | 15.9 | 62.3 | 111.8 |
| Comparative Example 1-7 | Tetrahydropyran (11.0) | Adiponitrile (1.0) | — | 7.9 | 62.4 | 76.6 |
| Comparative Example 1-8 | — | Adiponitrile (1.0) | Tetrahydrofuran (1.0) | 0.3 | 20.4 | 27.3 |

As is shown in Table 1, in Comparative Example 1-2, which used 1.0 mass % of only the formula (1) compound tetrahydropyran, both the gas generation ratio and the trickle capacity ratio were worse than in Comparative Example 1-1, which used reference electrolyte 1, while the former had a residual capacity ratio of 0.

On the other hand, in Comparative Example 1-3, which used 1.0 mass % of only the nitrile compound adiponitrile, the gas generation ratio, trickle capacity ratio, and residual capacity ratio were all somewhat improved.

When the formula (1) compound tetrahydropyran was used alone, the gas generation ratio, trickle capacity ratio, and residual capacity ratio were all worse (Comparative Example 1-2). But contrary to expectations, in Example 1-1 or Example 1-2, which used 1.0 mass % or 2.0 mass % of the formula (1) compound in combination with 1.0 mass % of the nitrile compound adiponitrile, in Example 1-3, which used 3.5 mass % of tetrahydropyran in combination with 3.5 mass % of the nitrile compound adiponitrile, and in Example 1-4, which used 6.0 mass % of tetrahydropyran in combination with 1.0 mass % of adiponitrile, the gas generation ratio, trickle capacity ratio, and residual capacity ratio were all greatly improved over that in Comparative Example 1-3, which used only the nitrile compound adiponitrile.

On the other hand, the residual capacity ratio in Comparative Example 1-4, which used 1.0 mass % of tetrahydropyran in combination with 6.0 mass % of adiponitrile, was inferior to that in Comparative Example 1-1. This is because the nitrile compound adiponitrile was used in excess of the use amount range according to the present invention.

Comparative Example 1-5—which used the nitrile compound adiponitrile in combination with 1,3-dioxane, a cyclic ether compound not encompassed by formula (1)—did provide an improvement in the gas generation ratio over that in Comparative Example 1-3, which used only the nitrile compound adiponitrile, but this effect was small and the trickle capacity ratio was worse. In addition, in Comparative Example 1-6—which used the nitrile compound adiponitrile in combination with 1,3-dioxolane, a cyclic ether compound not encompassed by formula (1)—both the gas generation ratio and trickle capacity ratio were worse than in Comparative Example 1-3, which used only the nitrile compound adiponitrile.

In Comparative Example 1-7, which used both 1.0 mass % of adiponitrile and 11.0 mass % of the formula (1) compound tetrahydropyran, the residual capacity ratio was worse than in Comparative Example 1-1. This is because the formula (1) compound tetrahydropyran was used in excess of the use amount range of the present invention.

In Comparative Example 1-8—which used 1.0 mass % of adiponitrile in combination with 1.0 mass % of tetrahydrofuran, a cyclic ether compound not encompassed by formula (1), the residual capacity ratio was worse than in Comparative Example 1-1.

These results demonstrate that—by using a non-aqueous electrolyte solution containing a compound represented by formula (1) at a content of at least 0.01 mass % and not more than 10 mass % with reference to the entire non-aqueous electrolyte solution and a nitrile compound at a content of at least 0.01 mass % and not more than 5 mass % with reference to the entire non-aqueous electrolyte solution—excellent results were exhibited that could not be predicted for each used alone. This was also shown to be superior to the case of use of both a nitrile compound and a cyclic ether compound not encompassed by formula (1), which is known art.

<Property Evaluation Testing>
Test 2. High-Temperature Storage Test at 80° C.

The battery fabricated as described above was conditioned at 25° C. by charging to 4.4 V and discharging to 3 V until the capacity was stable. Then, the battery, charged to 4.4 V, was held for 3 days in an 80° C. environment (high-temperature storage). The gas generation ratio (%) and OCV reduction ratio (%) were measured at this point. The amount of gas produced during the high-temperature storage test is determined using the Archimedes' method, and the gas generation ratio is taken to be the percentage (%) when the amount of gas in Comparative Example 2-1 (use of reference electrolyte solution 1) is made 100 (smaller numerical values for the gas generation ratio are better). In addition, the value of the voltage decline during the high-temperature storage test (i.e., the voltage difference pre-versus-post-high temperature storage, referred to in this Description as the voltage decline) is determined, and the OCV reduction ratio is taken to be the percentage (%) when the voltage decline in Comparative Example 2-1 (use of reference electrolyte solution 1) is made 100 (smaller numerical values are better).

Example 2-1 used the same electrolyte solution as in Example 1-1.

Comparative Example 2-1 used the reference electrolyte solution as such.

Comparative Example 2-2 used the same electrolyte solution as in Comparative Example 1-2.

Comparative Example 2-3 used the same electrolyte solution as in Comparative Example 1-3.

Comparative Example 2-4 used the same electrolyte solution as in Comparative Example 1-5.

TABLE 2

|  | Compound represented by formula (1) (mass %) | Nitrile compound (mass %) | Additional compound (mass %) | Gas generation ratio (%) | OCV reduction ratio (%) |
|---|---|---|---|---|---|
| Example 2-1 | Tetrahydropyran (1.0) | Adiponitrile (1.0) | — | 36.3 | 95.0 |
| Comparative Example 2-1 | — | — | — | 100.0 | 100.0 |
| Comparative Example 2-2 | Tetrahydropyran (1.0) | — | — | 113.4 | 111.7 |
| Comparative Example 2-3 | — | Adiponitrile (1.0) | — | 66.9 | 105.9 |
| Comparative Example 2-4 | — | Adiponitrile (1.0) | 1,3-dioxane (1.0) | 65.3 | 107.3 |

As shown in Table 2, both the gas generation ratio and the OCV reduction ratio were worse in Comparative Example 2-2—which used only tetrahydropyran, a cyclic ether compound represented by formula (1)—than in Comparative Example 2-1, which used reference electrolyte solution 1.

On the other hand, in Comparative Example 2-3, which used only the nitrile compound adiponitrile, the gas generation ratio was improved, but the OCV reduction ratio was somewhat degraded.

Thus, when used alone, tetrahydropyran, a cyclic ether compound represented by formula (1), gave a poorer gas generation ratio and OCV reduction ratio (Comparative Example 2-2), but when used with the nitrile compound adiponitrile in Example 2-1, both the gas generation ratio and the OCV reduction ratio were unexpectedly improved over that in Comparative Example 2-3, which used only the nitrile compound adiponitrile.

On the other hand, in Comparative Example 2-4, which used both the nitrile compound adiponitrile and 1,3-dioxane, which is a cyclic ether compound not encompassed by formula (1), the gas generation ratio was improved over that in Comparative Example 2-3, which used only the nitrile compound adiponitrile, but this effect was small and the OCV reduction ratio was worse.

These results demonstrate that—by using both a cyclic ether compound represented by formula (1) and a nitrile compound—excellent results are exhibited that cannot be predicted for each alone. This is also shown to be superior to the case of use of both a nitrile compound and a cyclic ether compound not encompassed by formula (1), which is known art.

<Property Evaluation Testing>
Test 3. High-Temperature Storage Test at 60° C.

The battery fabricated as described above was conditioned at 25° C. by charging to 4.4 V and discharging to 3 V until the capacity was stable. Then, the battery, charged to 4.4 V, was held for 14 days in a 60° C. environment (high-temperature storage). The gas generation ratio (%) and OCV reduction ratio (%) were measured at this point. The amount of gas produced from after battery fabrication until the completion of the test is determined using the Archimedes' method, and the gas generation ratio is taken to be the percentage (%) when the amount of gas in Comparative Example 3-1 is made 100 (smaller numerical values for the gas generation ratio are better). In addition, the value of the voltage decline during the high-temperature storage test (i.e., the voltage difference pre-versus-post-high temperature storage, referred to in this Description as the voltage reduction) is determined, and the OCV reduction ratio is taken to be the percentage (%) when the voltage reduction for Comparative Example 3-1 is made 100 (smaller numerical values for the OCV reduction ratio are better).

Example 3-1 used the same electrolyte solution as in Example 1-1.

Comparative Example 3-1 used the same electrolyte solution as in Comparative Example 1-3.

Comparative Example 3-2 used the same electrolyte solution as in Comparative Example 1-5.

Comparative Example 3-3 used the same electrolyte solution as in Comparative Example 1-6.

TABLE 3

|  | Compound represented by formula (1) (mass %) | Nitrile compound (mass %) | Additional compound (mass %) | Gas generation ratio (%) | OCV reduction ratio (%) |
|---|---|---|---|---|---|
| Example 3-1 | Tetrahydropyran (1.0) | Adiponitrile (1.0) | — | 75.4 | 91.9 |
| Comparative Example 3-1 | — | Adiponitrile (1.0) | — | 100.0 | 100.0 |
| Comparative Example 3-2 | — | Adiponitrile (1.0) | 1,3-dioxane (1.0) | 80.3 | 108.0 |
| Comparative Example 3-3 | — | Adiponitrile (1.0) | 1,3-dioxolane (1.0) | 94.0 | 140.7 |

As shown in Table 3, both the gas generation ratio and the OCV reduction ratio were improved in Example 3-1—which used both tetrahydropyran, a cyclic ether compound represented by formula (1), and the nitrile compound adiponitrile—in comparison to Comparative Example 3-1, which used only the nitrile compound adiponitrile.

On the other hand, in Comparative Example 3-2, which used both the nitrile compound adiponitrile and 1,3-dioxane, which is a cyclic ether compound not encompassed by formula (1), the gas generation ratio was improved over that in Comparative Example 3-1, but this effect was small and the OCV reduction ratio was worse. In addition, in Comparative Example 3-3, which used both the nitrile compound adiponitrile and 1,3-dioxolane, which is a cyclic ether compound not encompassed by formula (1), the gas generation ratio was again improved over that in Comparative Example 3-1, but this effect was small and the OCV reduction ratio was worse.

These results demonstrated that the use of both a cyclic ether compound represented by formula (1) and a nitrile compound was superior to the use of the nitrile compound alone, and was also superior to the use of a nitrile compound in combination with a cyclic ether compound not encompassed by formula (1), which is known art.

<Property Evaluation Testing>
Test 4. Cycle Testing

The battery fabricated as described above was conditioned at 25° C. by charging to 4.4 V and discharging to 3 V until the capacity was stable. 500 cycles were then carried out at 45° C., where a cycle was charging to 4.4 V at 0.7 C followed by discharging to 3 V at 0.7 C, and the gas generation ratio (%) was measured at this point. The amount of gas produced from after battery fabrication until the completion of the test is determined using the Archimedes' method, and the gas generation ratio is taken to be the percentage (%) when the amount of gas in Comparative Example 4-1 is made 100 (smaller numerical values for the gas generation ratio are better).

Example 4-1 used the same electrolyte solution as in Example 1-1.

Comparative Example 4-1 used the same electrolyte solution as in Comparative Example 1-1.

Comparative Example 4-2 used the same electrolyte solution as in Comparative Example 1-2.

Comparative Example 4-3 used the same electrolyte solution as in Comparative Example 1-3.

Comparative Example 4-4 used the same electrolyte solution as in Comparative Example 1-5.

TABLE 4

| | Compound represented by formula (1) (mass %) | Nitrile compound (mass %) | Additional compound (mass %) | Gas generation ratio (%) |
|---|---|---|---|---|
| Example 4-1 | Tetrahydropyran (1.0) | Adiponitrile (1.0) | — | 95.2 |
| Comparative Example 4-1 | — | — | — | 100.0 |
| Comparative Example 4-2 | Tetrahydropyran (1.0) | — | — | 323.8 |
| Comparative Example 4-3 | — | Adiponitrile (1.0) | — | 214.3 |
| Comparative Example 4-4 | — | Adiponitrile (1.0) | 1,3-dioxane (1.0) | 147.6 |

As shown in Table 4, Comparative Example 4-2, which used only tetrahydropyran, a cyclic ether compound represented by formula (1), and Comparative Example 4-3, which used only the nitrile compound adiponitrile, exhibited higher gas generation ratios in the 500-cycle cycling test than did Comparative Example 4-1, which used the reference electrolyte solution. In contrast, an unexpected improvement in the gas generation ratio was provided in Example 4-1, which used both the nitrile compound adiponitrile and tetrahydropyran, a cyclic ether compound represented by formula (1).

On the other hand, Comparative Example 4-4, which used both the nitrile compound adiponitrile and 1,3-dioxane, a cyclic ether compound not encompassed by formula (1), gave a worse gas generation ratio than did Comparative Example 4-1.

These results demonstrated that the use, in amounts within prescribed ranges, of both a cyclic ether compound represented by formula (1) and a nitrile compound provides effects that cannot be obtained by the use of either alone and is also superior to the use of a nitrile compound in combination with a cyclic ether compound not encompassed by formula (1), which is known art.

While the invention has been described in detail and with reference to specific embodiments thereof, it will be apparent to one skilled in the art that various changes and modifications can be made therein without departing from the spirit and scope thereof.

INDUSTRIAL APPLICABILITY

The non-aqueous electrolyte solution of the present invention suppresses the degradation of the electrolyte solution in non-aqueous electrolyte secondary batteries, suppresses gas generation during battery use in high-temperature environments, and suppresses gas generation during continuous charging and cycling, and enables the production of a non-aqueous electrolyte secondary battery having a high energy density. The non-aqueous electrolyte solution of the present invention can therefore be advantageously used in the various fields, e.g., electronic devices, where non-aqueous electrolyte secondary batteries are used.

There are no particular limitations on the applications of the non-aqueous electrolyte secondary battery of the present invention, and it can be used in a variety of known applications. Specific examples are notebook computers, pen-input computers, mobile computers, electronic book players, mobile phones, mobile fax machines, mobile copiers, portable printers, headphone stereos, video movie players, liquid crystal televisions, handheld vacuum cleaners, portable CD players, mini-disc players, transceivers, electronic organizers, calculators, memory cards, portable tape recorders, radios, back-up power supplies, motors, automobiles, motorcycles, motor bikes, bicycles, lighting equipment, toys, game machines, watches, power tools, electronic flashes, cameras, large-scale storage batteries for home use, and lithium ion capacitors.

The invention claimed is:

1. A non-aqueous electrolyte solution used in a non-aqueous electrolyte secondary battery that has a positive electrode having a positive electrode active material capable of absorbing and releasing a metal ion, and a negative electrode having a negative electrode active material capable of absorbing and releasing a metal ion, the non-aqueous electrolyte solution comprising:
 a compound represented by formula (1) in a content of at least 0.01 mass % and not more than 10 mass % with reference to the overall non-aqueous electrolyte solution; and
 a nitrile compound in a content of at least 0.01 mass % and not more than 5 mass % with reference to the overall non-aqueous electrolyte solution,

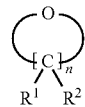

(1)

wherein $R^1$ and $R^2$ are each independently selected from a hydrogen atom, alkyl groups having 1 to 10 carbons, alkenyl groups having 2 to 10 carbons, alkynyl groups having 2 to 10 carbons, and aryl groups having 6 to 10 carbons, and n represents an integer that is at least 5 and not more than 10.

2. The non-aqueous electrolyte solution according to claim 1, wherein the compound represented by formula (1) is a compound in which n is 5 or 6.

3. The non-aqueous electrolyte solution according to claim 1, wherein the compound represented by formula (1) is a compound in which n is 5.

4. The non-aqueous electrolyte solution according to claim 1, wherein the nitrile compound is a compound that has two or more cyano groups.

5. The non-aqueous electrolyte solution according to claim 1, further comprising at least one compound selected from fluorinated cyclic carbonates and cyclic sulfate esters.

6. The non-aqueous electrolyte solution according to claim 1, wherein the $R^2$ is selected from alkyl groups having 1 to 10 carbons, alkenyl groups having 2 to 10 carbons, alkynyl groups having 2 to 10 carbons, and aryl groups having 6 to 10 carbons.

7. The non-aqueous electrolyte solution according to claim 1, further comprising cyclic sulfate esters in a content of at least 0.01 mass % and not more than 5 mass % with reference to the overall non-aqueous electrolyte solution.

8. The non-aqueous electrolyte solution according to claim 1, wherein the compound represented by formula (1) contains the plural number of $R^1$ and $R^2$, which differ each other.

9. A non-aqueous electrolyte secondary battery comprising:
a positive electrode having a positive electrode active material capable of absorbing and releasing a metal ion;
a negative electrode having a negative electrode active material capable of absorbing and releasing a metal ion; and a non-aqueous electrolyte solution, wherein
the non-aqueous electrolyte solution is the non-aqueous electrolyte solution according to claim 1.

* * * * *